No. 651,617. Patented June 12, 1900.
J. A. TILDEN.
WATER METER.
(Application filed July 15, 1898.)
(No Model.)
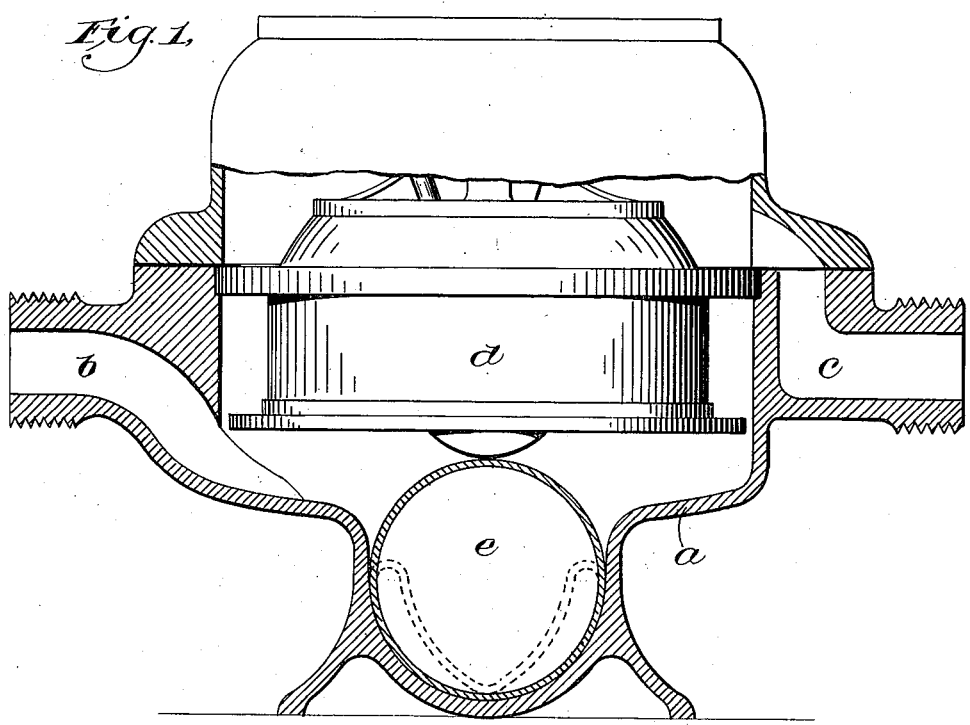
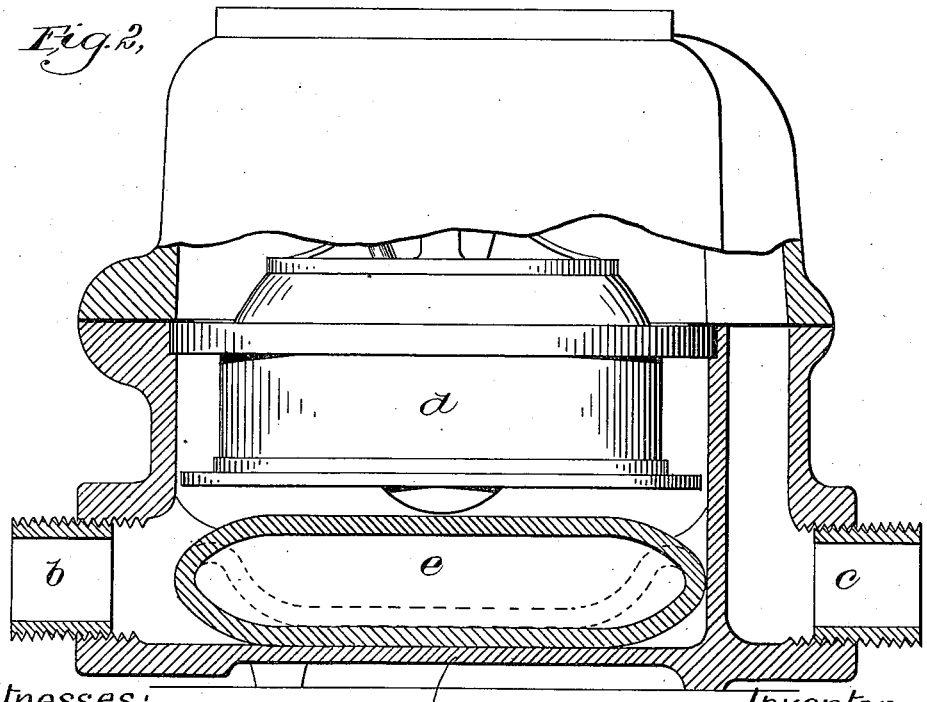
Witnesses:
Inventor
James H. Tilden,
by J. P. H. Livermore,
Att'ys.

UNITED STATES PATENT OFFICE.

JAMES A. TILDEN, OF HYDE PARK, MASSACHUSETTS, ASSIGNOR TO THE HERSEY MANUFACTURING COMPANY, OF BOSTON, MASSACHUSETTS.

WATER-METER.

SPECIFICATION forming part of Letters Patent No. 651,617, dated June 12, 1900.

Application filed July 15, 1898. Serial No. 685,986. (No model.)

*To all whom it may concern:*

Be it known that I, JAMES A. TILDEN, of Hyde Park, county of Norfolk, and State of Massachusetts, have invented an Improvement in Water-Meters, of which the following description, in connection with the accompanying drawings, is a specification, like letters on the drawings representing like parts.

The present invention relates to appliances for protecting water-meters and the like from injury by freezing, the construction and arrangement being such that no part of the meter or meter-casing is injured or displaced by the freezing of the water, all of the working parts remaining in their normal relative positions at all times and resuming their normal operation after the ice has thawed.

Various expedients have been adopted for the purpose of preventing injury to the actual working parts of water-meters by freezing, the construction heretofore adopted, however, depending upon the yielding or breaking of some part of the outer casing or its fastenings which can be easily and inexpensively replaced; but in those constructions in which there is actual rupture of a part the meter though not permanently injured to any material extent is rendered temporarily inoperative, thus necessitating repairs, which, however inexpensive, are troublesome. The meter, moreover, is temporarily disabled, so that leakage and water damage will ensue if the meter is not duly attended to.

In carrying out the present invention a portion of the space within the rigid outer casing of the meter is occupied by a yielding indestructible elastic cushion, such as an air-chamber having a flexible wall, so that as the temperature falls and the fluid begins to exert pressure above the normal the said cushion yields to said increase in pressure, the whole body of the water thus having a larger space to occupy as it expands in approaching the freezing-point, so that when freezing finally occurs neither the inner casing of the meter and its contained parts nor the outer casing of the meter is injured. The cushion being elastic and having sufficient resistance to counteract the normal pressure of the water will resume its normal condition as soon as the pressure is relieved by the thawing of the ice, so that as soon as the temperature rises the meter at once becomes operative without repairs and without renewal or repositioning of any of the parts. Furthermore, as has already been stated, the expansion is allowed to be distributed throughout the entire body by the gradual yielding of the cushion, there being substantially no positive restraint, as is the case where a member is adapted to be actually broken away, since it is impossible to make such a member so that it will yield to a slight increase of pressure without involving liability of breakage under usual working conditions. Furthermore, in a construction in which the outer casing is provided with a plug secured by screw-threads arranged to be stripped when a certain predetermined pressure is encountered it is obvious that the screw-threads will exert resistance up to a certain point and will finally yield upon the sudden increase of pressure at the time when the water actually freezes, so that there is liability that the water contained within the inner casing instead of having its expansion distributed throughout the mass at the moment of solidifying may have the portion within the inner casing expand suddenly in the act of solidifying owing to the sudden relief of the pressure due to the rupture of the confining-walls, and thus strain the inner casing and injure the working parts even though the casing itself is saved by the yielding of the plug when the threads are stripped. An attempt has been made to overcome this objection by having a portion of the casing secured by yielding and resilient fastenings intended to permit the portion of the outer casing secured by them to yield outwardly, so as to open and afford a vent from the casing in response to the expansion of the water when freezing, the said fastenings being intended to restore the said movable portion to normal position, so as to close the casing when the pressure is relieved by the thawing of the ice. This construction is open to objection, since if the movable part is loosely fitted, so as to move freely when unseated, there is liability of leakage by movement before ice is actually formed. On the other hand, if the movable part has a tight fit like a piston to prevent leakage during its movement there is liability of sticking, so that it and the internal working parts of the meter (which in such construction are loosely connected and inseparable, being normally retained in working position by the movable part of the casing when closed or in normal position) will not be restored to normal working position by the resilient fastenings when the ice is thawed.

All of the above-named objections are obviated by the present invention, which consists, broadly, in providing capacity for expansion of the contents of the meter or chamber to be protected from damage by freezing without movement of any of the working parts or of any part of the rigid casing or its fastenings.

In the preferable construction provision for expansion of the liquid contents of the meter is made by providing a flexible resilient wall exposed to the pressure of the water in the casing, which wall normally withstands the pressure of the liquid when under normal conditions, but which yields when subjected to abnormal pressure, and thus affords increased capacity for the liquid contents of the meter sufficient to provide for the expansion of the liquid in solidifying when the normal inlet and outlet of the meter are closed or obstructed, as by the freezing of the water therein before the water in the meter itself is frozen.

Figure 1 is a longitudinal section of a water-meter having provision for protection from injury by freezing embodying this invention; and Fig. 2 is a similar view showing a modified construction, the dotted lines in each view showing the position of the parts when the water is frozen or the pressure otherwise rendered abnormal.

The meter, including the outer chamber or casing $a$, having the usual inlet and outlet passage $b$ and $c$ and the measuring appliances contained in the internal chamber $d$, may all be of usual construction, the said measuring-mechanism chamber having its parts permanently assembled and without provision for separability or movement from the relative position which they occupy in the normal operation.

In order to protect the outer chamber or casing $a$ from bursting and the working parts from damage by the enormous expansive pressure exerted by the liquid contents in case of freezing, the meter is in accordance with this invention provided with a flexible walled chamber $e$, shown in Fig. 1 as a hollow sphere, which may be made of flexible india-rubber or other flexible material impervious to water and affording sufficient resistance to compression to retain its normal expanded or spherical shape when subjected only to the normal pressure of the liquid contained in or flowing through the meter. In case, however, the said liquid should forcibly expand while confined in the meter-chamber with the inlet and outlet passage $b$ and $c$ obstructed, as takes place in case of freezing, the abnormal pressure will compress and collapse the air-chamber $e$, as shown in dotted lines, thus affording more space in the chamber $a$ for the liquid, which is thus permitted to expand without increasing the internal pressure or strain upon the walls of the casing beyond the amount which is required to collapse the chamber $e$. The liquid in this manner is permitted to expand without excessive increase in pressure to the point at which it actually solidifies, and there is therefore no sudden flow or change of position of the liquid at the instant of solidifying, and consequently no need of provision for separability of the parts of the measuring mechanism proper in the chamber $d$ to prevent damage thereto when the liquid freezes. There is therefore a great advantage over that class of appliances in which there is no yielding or rupture until after the pressure of the expanding liquid has greatly exceeded the normal pressure, so that when the restraint to the liquid is finally overcome it is converted, substantially, instantaneously from the liquid to the solid condition, the change being accompanied by a sudden expansion throughout all its parts, which would rupture the internal chamber $d$ or the measuring appliances proper unless provision were made for separability of its parts under such sudden expansive pressure exerted therein.

The invention is not limited to any specific form of the yielding wall within the rigid parts of the casing, and, as shown in Fig. 2, a somewhat different form of internal yielding wall or collapsible chamber is provided.

As shown in Fig. 1, the wall of the chamber $e$ has but little rigidity of its own, and therefore has to be normally retained in an expanded condition by air or similar elastic fluid contents, which should be under a pressure about equal to the normal external pressure of the liquid in the meter, so as to retain the chamber properly expanded until the internal pressure is overcome by the increasing pressure of the external liquid due to its expansion in freezing.

As shown in Fig. 2, the internal flexible walled chamber $e$ is approximately cylindrical in shape and has its wall of sufficient rigidity to sustain the normal external pressure without collapse, but sufficiently flexible and elastic to yield under the abnormal pressure developed when the liquid freezes.

In either construction the capacity of the chamber $e$ should be greater than the amount that the liquid contents of the meter increases in volume in freezing, so that the air contained in the chamber while being highly compressed when freezing takes place will still not be compressed enough to exert a pressure sufficient to endanger the breakage of the main case *a* of the meter.

I claim—

The combination with the rigid outer casing of a water-meter, of a flexible walled air-chamber contained therein and subjected to the pressure of the surrounding liquid, substantially as and for the purpose described.

In testimony whereof I have signed my name to this specification in the presence of two subscribing witnesses.

JAMES A. TILDEN.

Witnesses:
H. J. LIVERMORE,
NANCY P. FORD.